(12) United States Patent
Dragic (10) Patent No.: US 7,463,807 B2
(45) Date of Patent: Dec. 9, 2008

(54) WAVEGUIDE CONFIGURATION

(76) Inventor: Peter Dragic, 1307 Bluegrass, Champaign, IL (US) 61821

( * ) Notice: Subject to any disclaimer, the term of this patent is extended or adjusted under 35 U.S.C. 154(b) by 0 days.

(21) Appl. No.: 11/482,174

(22) Filed: Jul. 6, 2006

(65) Prior Publication Data

US 2008/0008432 A1    Jan. 10, 2008

(51) Int. Cl.
*G02B 6/02* (2006.01)
(52) U.S. Cl. .................................................. 385/127
(58) Field of Classification Search ................ 385/127
See application file for complete search history.

(56) References Cited

U.S. PATENT DOCUMENTS

| | | | | | |
|---|---|---|---|---|---|
| 4,077,023 | A | * | 2/1978 | Boyd et al. | 333/147 |
| 4,742,318 | A | * | 5/1988 | Jen et al. | 333/141 |
| 4,792,207 | A | * | 12/1988 | Shaw et al. | 385/28 |
| 2006/0171648 | A1 | * | 8/2006 | Hasegawa | 385/127 |

* cited by examiner

*Primary Examiner*—Ellen Kim
(74) *Attorney, Agent, or Firm*—Patti, Hewitt & Arezina LLC (57) ABSTRACT

A waveguide configuration comprising an optical core, an optical cladding, an acoustic core and an acoustic cladding. The acoustic core has two regions. The first region radial thickness is smaller than the optical core radial thickness and the sum of the first region radial thickness and the second region radial thickness is greater than the optical core radial thickness. The first region acoustic velocity is greater than the second region acoustic velocity and the acoustic cladding acoustic velocity is greater than the second region acoustic velocity. In one variation, the first region acoustic velocity is less than the second region acoustic velocity and the acoustic cladding acoustic velocity is less than the second region acoustic velocity.

38 Claims, 8 Drawing Sheets

FIGURE 5

WAVEGUIDE CONFIGURATION

BACKGROUND OF THE DISCLOSURE

1. Field of the Disclosure

The disclosed mechanism relates in general to a waveguide configuration, and more particularly, to a waveguide configuration which is particularly well suited for the suppression of SBS due to an interaction of acoustic waves with optical signals.

2. Background Art

The use of waveguides in various industries such as telecommunications and lasers, among others, has been steadily increasing. While the ability to send optical signals through waveguides is well known in the art, certain deleterious phenomena have been observed. In particular, one effect that has been observed is the Stimulated Brillouin Scattering (SBS) effect.

SBS is an important example of a stimulated scattering process; light scattering which occurs when the intensity of the light field itself affects the propagating medium (i.e., an effect caused by the spatial and spectral overlap between the optical waves and the acoustic modes that form in the waveguide)This phenomenon has become relevant in the optical fiber industry, due to the increasing intensity required in optical fiber cores and the relatively long interaction lengths. SBS is one of the major limiting factors on the amount of power that can be transmitted via an optical fiber.

Attempts to suppress the SBS effect have relied on waveguides which have particular constructions. While some of the solutions have suppressed the SBS effect to some extent, many of these waveguides have constructions which are difficult to manufacture on a large scale, or which are economically not feasible.

More recently, certain solutions have provided greater enhancement of SBS suppression relative to prior art solutions. Such solutions include Dragic, U.S. patent application Ser. No. 10/766,289 filed Jan. 27, 2004, entitled "Waveguide Configuration" and Dragic, U.S. patent application Ser. No. 11/052,464 filed Feb. 7, 2005, entitled "Waveguide Configuration." The entire disclosures of these applications are incorporated by reference herein for all that they teach and without limitation to this particular section.

SUMMARY OF THE DISCLOSURE

Further SBS suppression in a waveguide configuration can be achieved by squeezing certain acoustic modes within the optical core and moving other acoustic modes away from the optical core, thereby minimizing the overlap with optical signals. By lessening the overlap, SBS suppression can be increased.

More specifically, the disclosure is directed to a waveguide comprising an optical core, at least one optical cladding, an acoustic core and an acoustic cladding. The optical core includes an optical core radial thickness and a core index of refraction. The at least one optical cladding surrounds the optical core. The optical cladding includes a cladding index of refraction. The optical core and cladding define an optical mode. The effective index of refraction of the optical mode is greater than the cladding index of refraction. The acoustic core includes two regions. The first region has a first region radial thickness and a first region acoustic velocity. The second region surrounds the first region and has a second region radial thickness and a second region acoustic velocity. An acoustic cladding surrounds the acoustic core and includes an acoustic cladding acoustic velocity. The first region radial thickness is smaller than the optical core radial thickness and the sum of the first region radial thickness and the second region radial thickness is greater than the optical core radial thickness. The first region acoustic velocity is greater than the second region acoustic velocity and the acoustic cladding acoustic velocity is greater than the second region acoustic velocity.

In a preferred embodiment, the first region radial thickness is less than approximately 66% that of the optical core radial thickness. In another preferred embodiment, the first region radial thickness is less than approximately 50% that of the optical core radial thickness.

In another embodiment, the total of the first region radial thickness and second region radial thickness is at least 33% greater than the optical core radial thickness.

In a preferred embodiment, the waveguide further includes a buffer surrounding an outermost cladding of the at least one cladding, the buffer having an index of refraction. In one such embodiment, the at least one optical cladding comprises a single cladding and the index of refraction of the buffer is greater than the index of refraction of the single cladding. In another preferred embodiment, the at least one optical cladding comprises a single cladding and the index of refraction of the buffer is less than the index of refraction of the single cladding. In yet another preferred embodiment, the at least one optical cladding comprises at least a first optical cladding and a second optical cladding surrounding the first optical cladding. The index of refraction of the buffer is less than the index of refraction of the second optical cladding.

In another preferred embodiment, the acoustic velocity of the first region is one of greater than and equal to the acoustic velocity of the acoustic cladding.

In another preferred embodiment, the optical core is doped with a rare earth element of the group consisting of: Einsteinium, Erbium, Neodymium, Praseodymium, Samarium, Thulium, Ytterbium, Dysprosium, Holmium and combinations of the foregoing.

In another preferred embodiment, the waveguide further includes polarization maintaining means.

In another preferred embodiment, an outermost cladding of the at least one cladding has an outer boundary. The outer boundary of the outermost cladding of the at least one cladding being non-circular in cross-sectional configuration.

In a preferred embodiment, at least a portion of the optical core is doped with $Al_2O_3$.

In another preferred embodiment, an outermost optical cladding of the at least one optical cladding comprises $SiO2$.

In a preferred embodiment, the optical cladding is doped with at least one of the group consisting of B, F, Ge, P, Ti and combinations of the foregoing.

Preferably, the SBS threshold is at least eight times that of bulk pure silica, and in certain embodiments, at least 20 times that of bulk pure silica.

In a preferred embodiment, the optical core has a radial thickness of at least 7.5 microns.

In a preferred embodiment, the optical cladding has a diameter of approximately 400 microns.

In another aspect, the disclosure sets forth a waveguide comprising an optical core, at least one optical cladding, an acoustic core and an acoustic cladding. The optical core includes an optical core radial thickness and a core index of refraction. The at least one optical cladding surrounds the optical core. The optical cladding includes a cladding index of refraction. The optical core and cladding define an optical mode. The effective index of refraction of the optical mode is greater than the cladding index of refraction. The acoustic core includes two regions. The first region has a first region radial thickness and a first region acoustic velocity. The second region surrounds the first region and has a second region radial thickness and a second region acoustic velocity. An acoustic cladding surrounds the acoustic core and includes an acoustic cladding acoustic velocity. The first region radial thickness is smaller than the optical core radial thickness and the sum of the first region radial thickness and the second region radial thickness is greater than the optical core radial thickness. The first region acoustic velocity is less than the second region acoustic velocity and the acoustic cladding acoustic velocity is less than the second region acoustic velocity.

In yet another aspect, the disclosure sets forth a method of increasing an SBS threshold comprising the steps of identifying a first dominant acoustic mode within a waveguide; identifying a second dominant acoustic mode within a waveguide; and controllably guiding each of the first and second dominant acoustic modes in at least two regions of an acoustic core.

Preferably, the second dominant acoustic mode comprises an acoustic mode where an acoustic velocity thereof is greater than the longitudinal acoustic velocity of either the acoustic core or the acoustic cladding.

In yet another aspect, the disclosure sets forth a waveguide having an optical core and an optical cladding, and, an acoustic core and an acoustic cladding. The waveguide is configured such that an acoustic boundary resides within the optical core and an optical boundary resides within the acoustic core.

In yet another aspect, the disclosure sets forth a waveguide having an optical core and an optical cladding, an acoustic core and an acoustic cladding, and means for controllably guiding a first dominant acoustic mode and a second dominant acoustic mode within the acoustic core toward degrading the spectral and spatial overlap between an optical wave and the first and second acoustic modes.

BRIEF DESCRIPTION OF THE DRAWINGS

The disclosed mechanism will now be described with reference to the drawings wherein.

DETAILED DESCRIPTION OF THE DRAWINGS

While this disclosed mechanism is susceptible of embodiment in many different forms, there is shown in the drawings and described herein in detail a specific embodiment with the understanding that the present disclosure is to be considered as an exemplification of the principles of the disclosed mechanism and is not intended to limit the disclosure to the embodiment illustrated.

It will be understood that like or analogous elements and/or components, referred to herein, may be identified throughout the drawings by like reference characters. In addition, it will be understood that the drawings are merely schematic representations, and some of the components may have been distorted from actual scale for purposes of pictorial clarity.

Figure 1A:
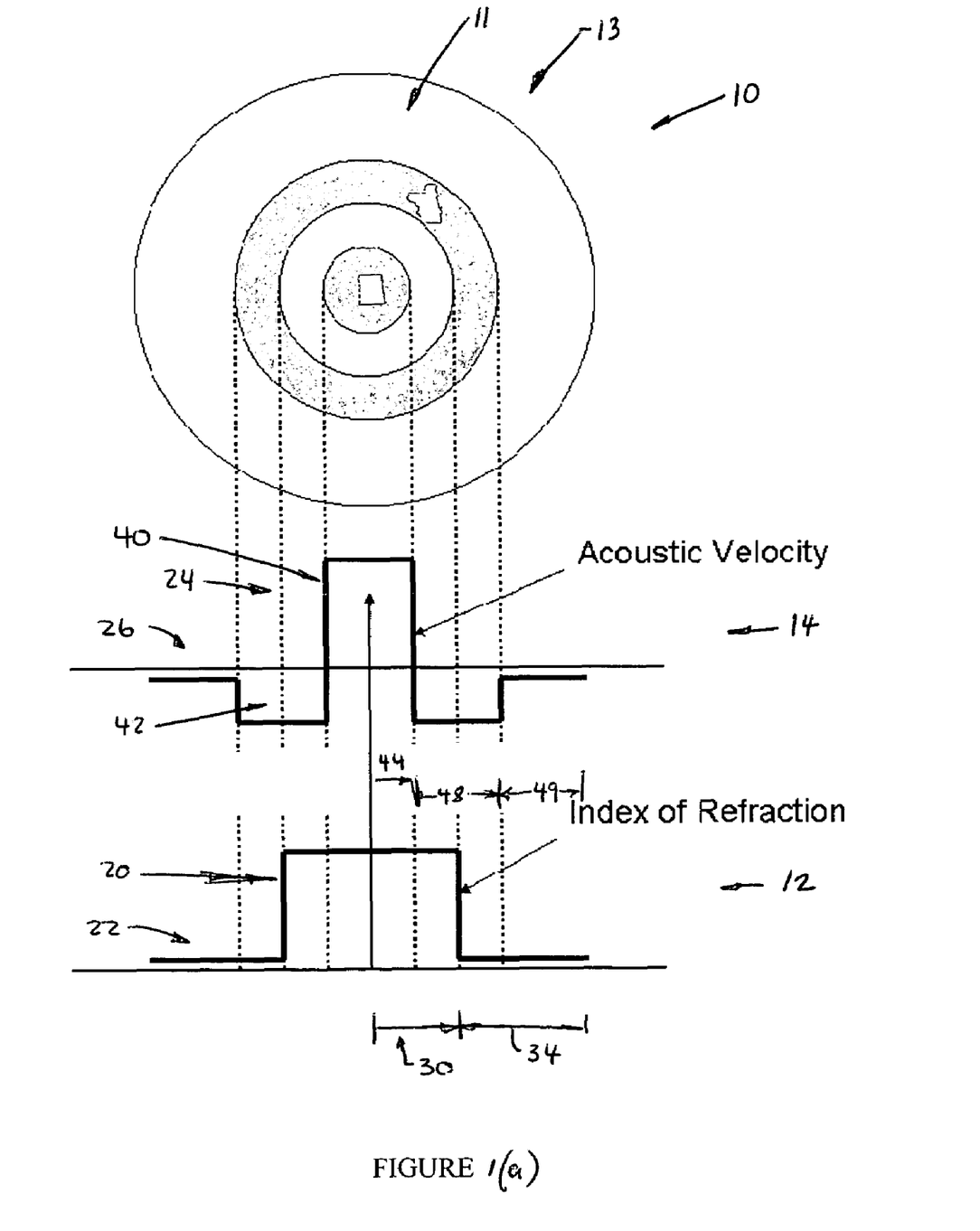
FIGS. 1(a) and 1(b) of the drawings comprises a end view of a waveguide configuration showing, in particular, a schematic representation of each of the optical and acoustic profiles thereof.
Figure 1B:
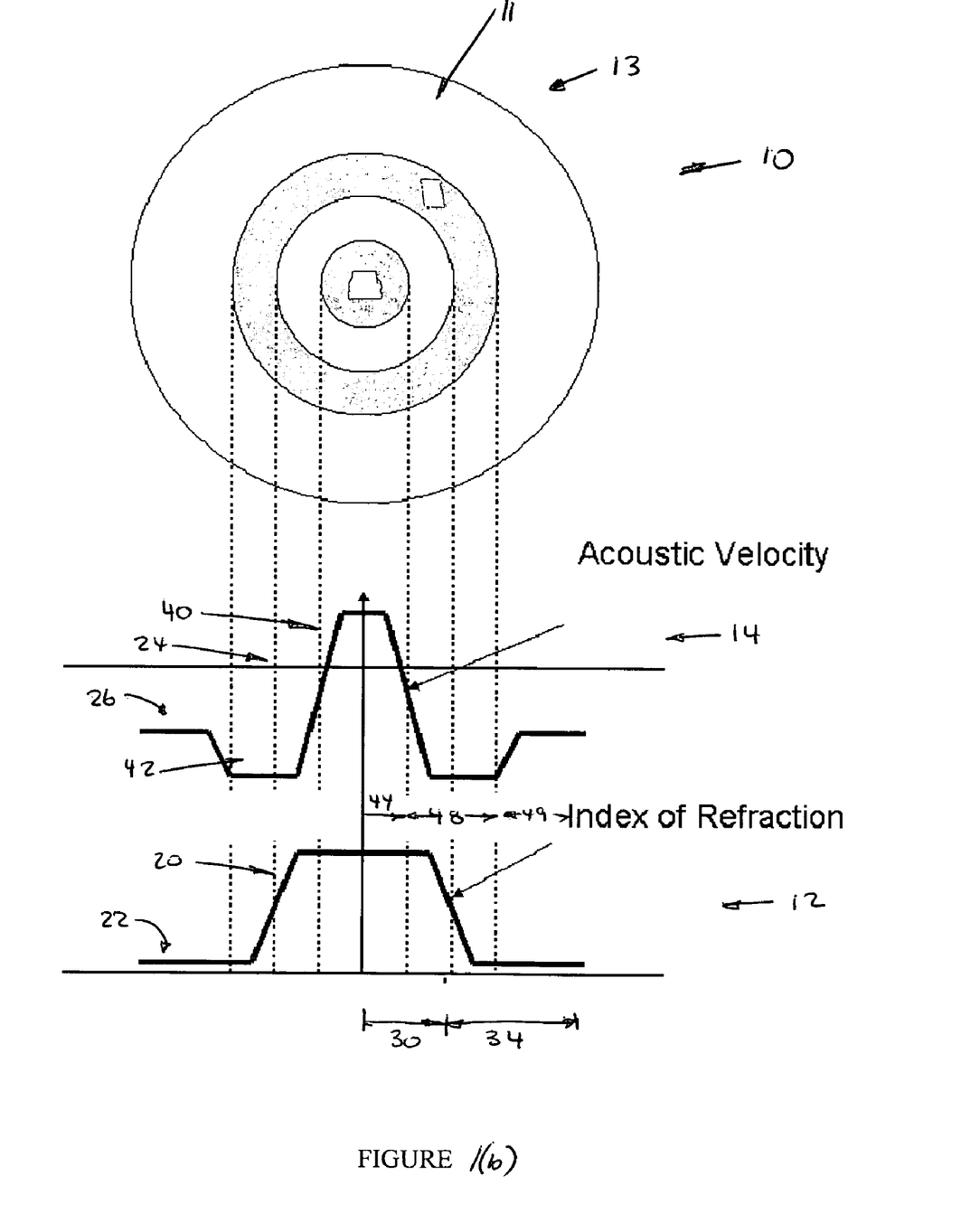
Figure 2A:
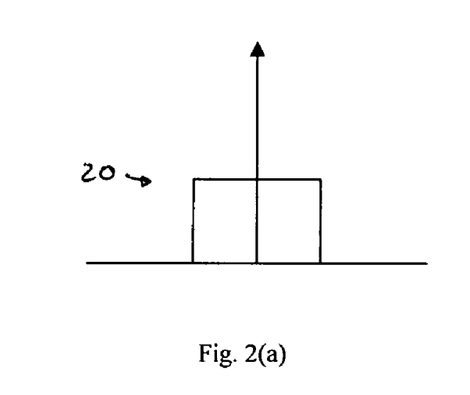
FIGS. 2(a) through 2(e) of the drawings comprise a plurality of index of refraction profiles for a number of exemplary waveguides made pursuant of the present disclosure.
Figure 2B:
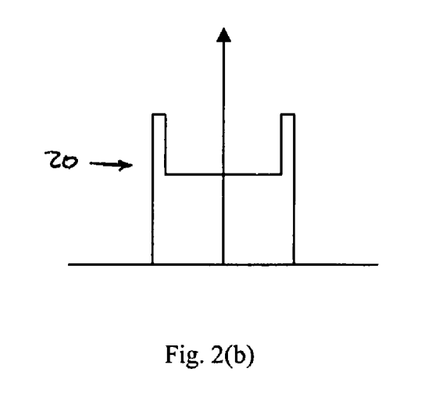
Figure 2C:
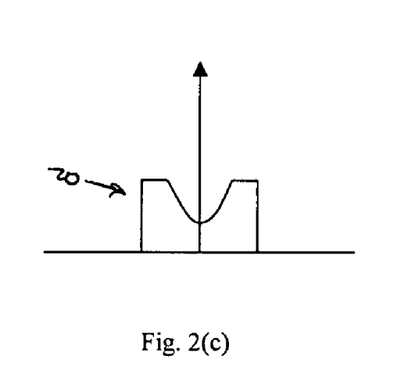
Figure 2D:
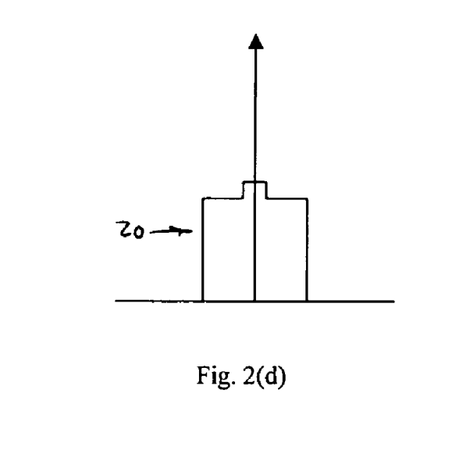
Figure 2E:
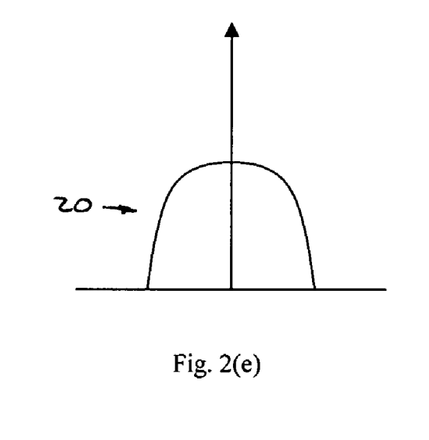

Referring now to the drawings and in particular to FIGS. 1(a) and 1(b), a waveguide of the is shown generally at 10. The waveguide includes body 111 and buffer 13. The waveguide is well suited for use as telecommunication fiber, laser fiber, sensing fiber, among others. Indeed, the present waveguide that is disclosed is not limited to any particular use. Typically, the body of the waveguide is formed from glass ($SiO_2$) which is doped as necessary to achieve the optical profile 12 and acoustic profile 14 as set forth below.

Specifically, with respect to the optical profile 12, the waveguide includes an optical core 20 and an optical cladding 22. The optical core has an optical core radial thickness 30 and an optical core index of refraction. While not limited thereto, in a preferred embodiment, at least 60% of the light is directed through the optical core. It will be understood that the optical core index of refraction may comprise a profile which may vary within the core itself. Various optical cores having non-uniform indices of refraction across their respective radii are shown in FIGS. 2(a) through 2(e). It will be understood that the optical core diameter of a typical waveguide made in accordance with the present disclosure may be 4 microns to 20 microns in diameter, and even up to 50 microns in diameter. Of course, the present disclosure is not limited to any particular range of diameters of the optical core.

The optical cladding 22 comprises an optical cladding radial thickness 34 and an optical cladding index of refraction. As with the optical core index of refraction, the optical cladding index of refraction may be uniform along the cross-sectional configuration of the fiber, or may be varied across the cross-sectional configuration of the fiber.

The optical core and the optical cladding cooperate to define an optical mode. The optical mode defines an effective optical mode index of refraction. The effective index of refraction of the optical mode is greater than the optical cladding index of refraction 36, thereby producing an effective waveguide configuration. It will be understood that the diameter of the body of the fiber, that is, the sum of the optical core and the optical cladding may be 80 microns to 500 microns in diameter. Again, the present disclosure is not limited to any particular range of diameters of the optical core or the optical cladding.

The waveguide 10 further includes acoustic characteristics 14. In particular, the waveguide 10 includes acoustic core 24 and acoustic cladding 26. The acoustic cladding 26 surrounds the acoustic core 24, and has a radial thickness 49. The acoustic core includes at least two regions, first region 40 and second region 42. The second region of the acoustic core surrounds the first region of the acoustic core. While certainly not limited thereto, in a preferred embodiment, at least 90% of the acoustic energy is directed through the acoustic core.

The first region of the acoustic core includes a first region radial thickness 44 and a first region acoustic velocity. The second region includes a second region radial thickness 48 and a second region acoustic velocity. It will be understood that within either of the first region and the second region, the respective acoustic velocity may be substantially uniform or may be substantially non-uniform.

In one exemplary embodiment, as is shown in FIGS. 1(*a*) and 1(*b*), the first region acoustic velocity is greater than the second region acoustic velocity. The acoustic cladding acoustic velocity is greater than the second region acoustic velocity. Preferably, the acoustic velocity of the first region is either greater than or equal to the acoustic velocity of the acoustic cladding.

Figure 3A:
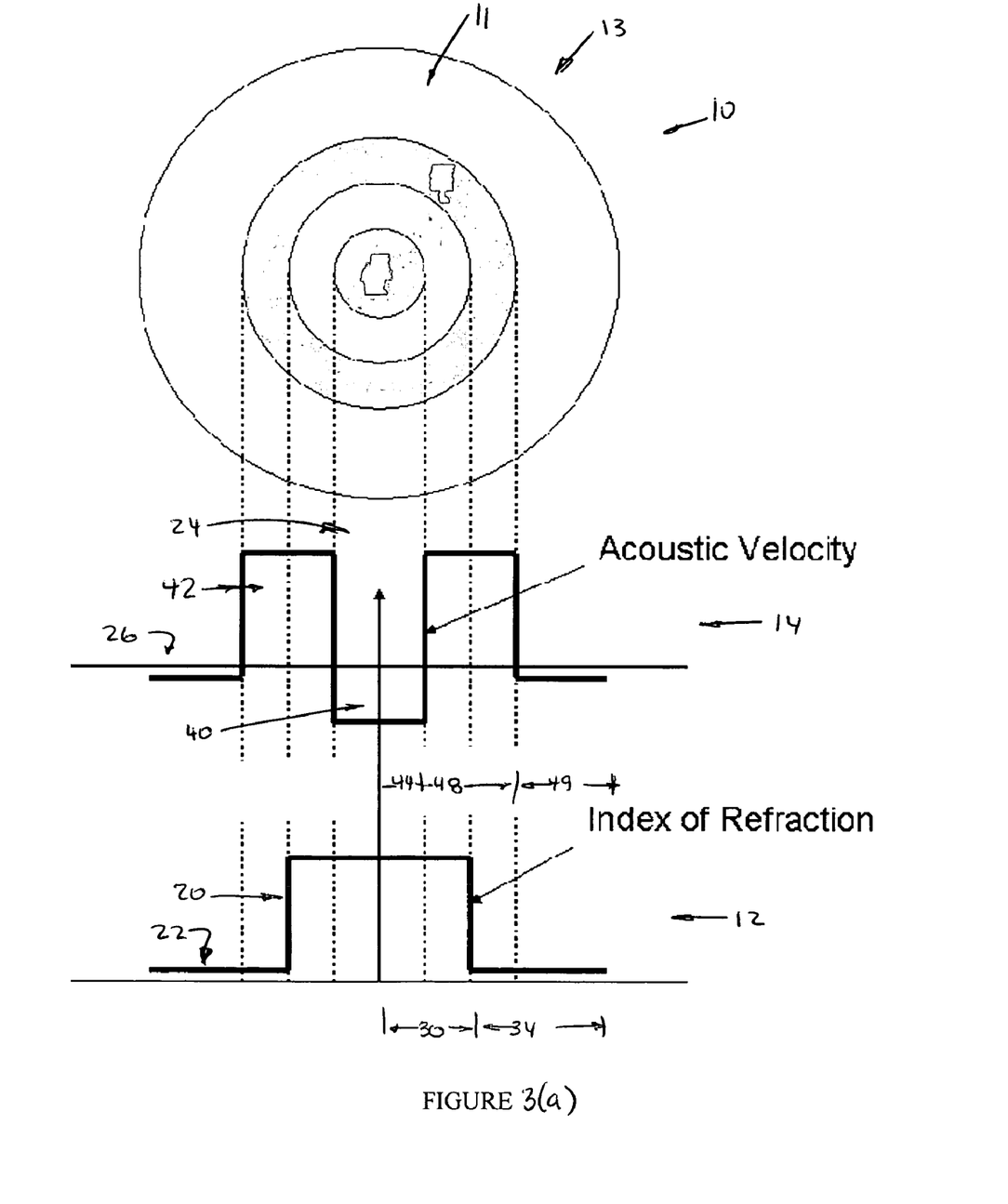
FIGS. 3(a) and 3(b) of the drawings comprises an alternate embodiment of a waveguide configuration, showing, in particular, a schematic representation of each of the optical and acoustic profiles thereof.
Figure 3B:
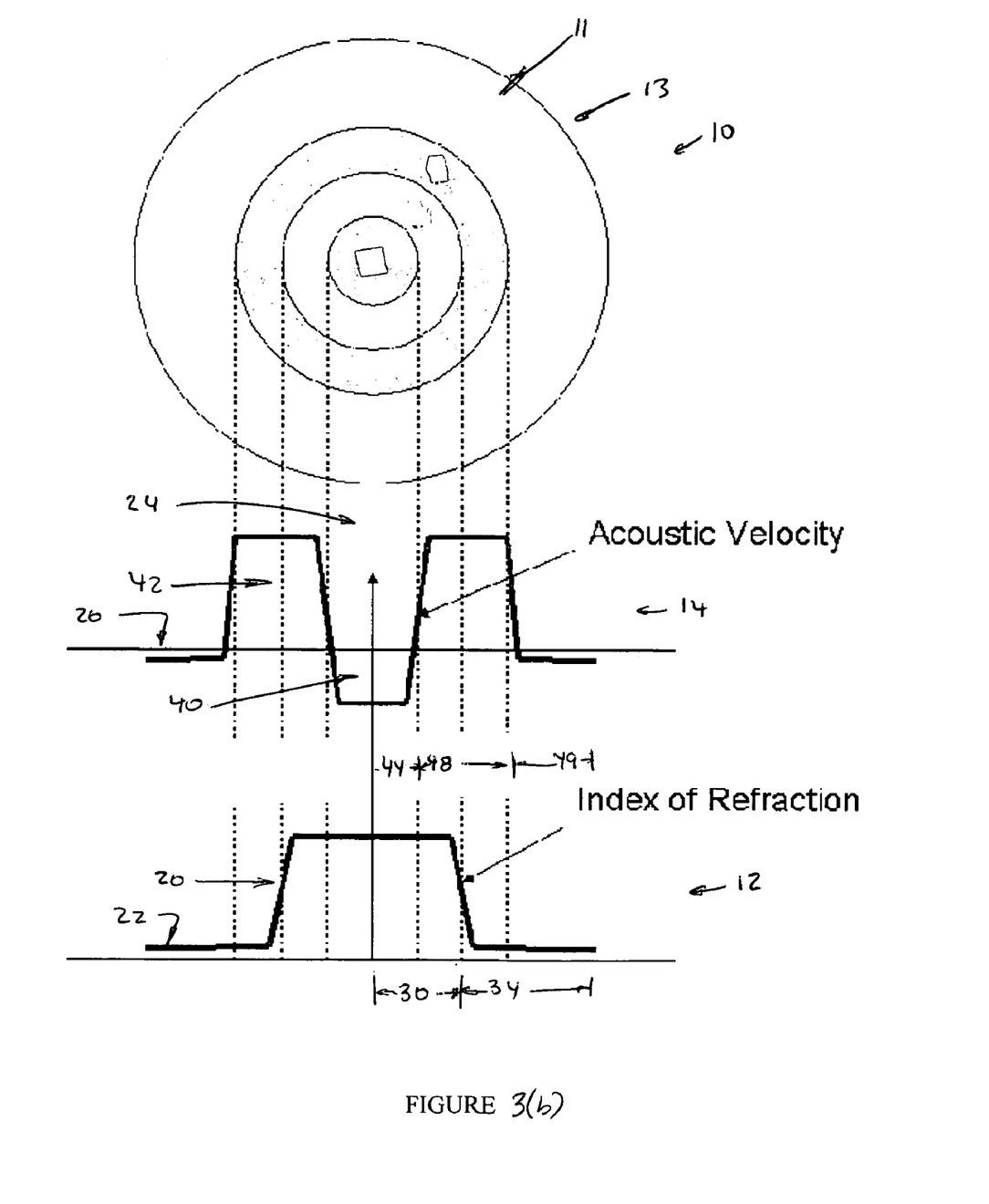

In another exemplary embodiment, as is shown in FIGS. 3(*a*) and 3(*b*), the first region acoustic velocity is less than the second region acoustic velocity. The acoustic cladding acoustic velocity is less than the second region acoustic velocity. Preferably, the acoustic velocity of the first region is one of greater than and equal to the acoustic velocity of the acoustic cladding. Such a configuration, while a vast improvement over the prior art, typically will not exhibit the SBS performance of the exemplary embodiment of FIGS. 1(*a*) and 1(*b*).

It will be understood that, as is shown in FIG. 1, the optical characteristics and the acoustic characteristics overlap within the body of the waveguide. As such, the optical characteristics and the acoustic characteristics have certain properties relative to each other. In particular, the first region radial thickness 44 of the acoustic core 24 is smaller than the optical core radial thickness 30 of the optical core 20. The sum total of the first region radial thickness and the second region radial thickness is greater than the optical core radial thickness. In the configurations shown in FIG. 1 and FIG. 3, an acoustic boundary resides within the optical core and an optical boundary resides within the acoustic core.

Figure 4A:
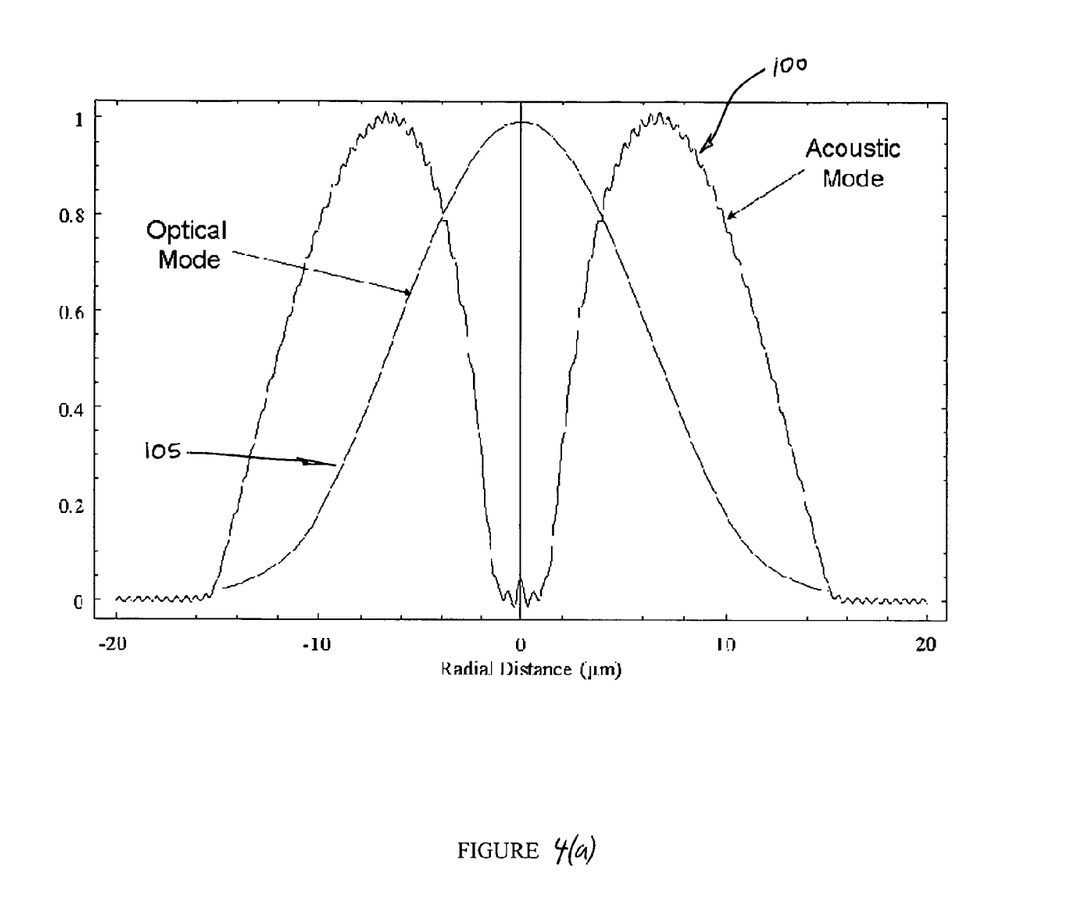
FIG. 4(a) of the drawings comprises a graph showing, in particular, the normalized acoustic profile of an exemplary first dominant acoustic mode of an exemplary waveguide of the present disclosure.
Figure 4B:
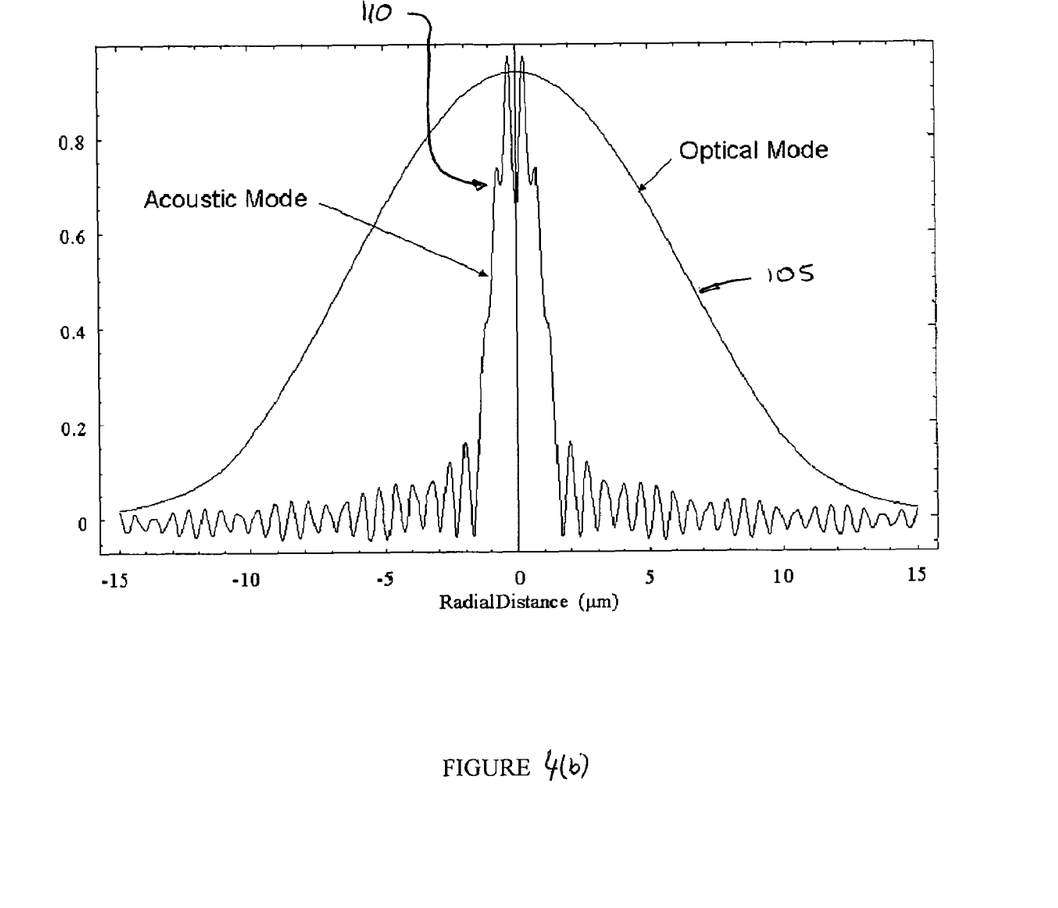
FIG. 4(b) of the drawings comprises a graph showing, in particular, the normalized acoustic profile of an exemplary second dominant acoustic mode of an exemplary waveguide of the present disclosure.

What has been found is that there are two dominant acoustical modes typically becoming the most significant in a fiber of the above-described design. A typical first mode is shown in FIG. 4(*a*) as 100 and a typical second mode is shown in FIG. 4(*b*) as 110, with the optical mode shown as 105. The first mode comprises what are considered guided acoustic waves. The second mode generally arises from acoustic modes where the acoustic velocity of the mode is greater than the longitudinal acoustic velocity of either the acoustic core or the acoustic cladding. Typically, the second mode takes on a spatial profile defined by a Bessel function of the first kind (typically resulting in a function that looks much like that of the optical mode). To minimize the overlap integral of the optical intensity and the acoustic velocity, a significant portion of the optical mode is in the second region of the acoustic core. Additionally, a significant portion of the optical mode is in the first region of the acoustic core. Thus, the second mode is squeezed inwardly toward the central region of the body of the waveguide, while the first mode is brought outwardly as a ring around a central region of the body of the waveguide. Thus, the first and second acoustic core regions are configured to guide the first acoustic mode and the second acoustic mode such that interaction with the optical signal is minimized.

Preferably, the first region radial thickness is less than approximately 66% that of the optical core radial thickness. More preferably, the first region radial thickness is less than approximately 50% that of the optical core radial thickness. It is likewise preferred that the sum of the first region radial thickness and the second region radial thickness is at least 33% greater than the optical core radial thickness.

Such a configuration as described above can be achieved utilizing a variety of dopants. In particular, the optical core may be doped with Aluminum, and the optical cladding may be doped selectively with Aluminum, Boron, Fluorine, Phosphorous, Germanium, Titanium and combinations of the foregoing. In active fibers, an additional dopant may be Einsteinium, Erbium, Neodymium, Praseodymium, Samarium, Thulium, Ytterbium, Holmium, Dysprosium and combinations of the foregoing. While not required, the outermost acoustic cladding may comprise a substantially dopant free $SiO_2$.

Buffer 28 surrounds the outermost of the optical cladding. The buffer may comprise any number of different materials which enhance the mechanical properties of the waveguide and which typically increases ductility of the waveguide. In a typical single clad fiber, the index of refraction of the buffer is greater than the index of refraction of the outermost optical cladding. Although, in a dual clad configuration, the index of refraction of the buffer is less than the index of refraction of the outermost of the at least one optical cladding.

It is likewise contemplated that the outermost optical cladding (in a dual cladding fiber) is non circular in configuration so as to limit the propagation of helical modes within the fiber. Such a non circular configuration is well known in the art.

Figure 5:
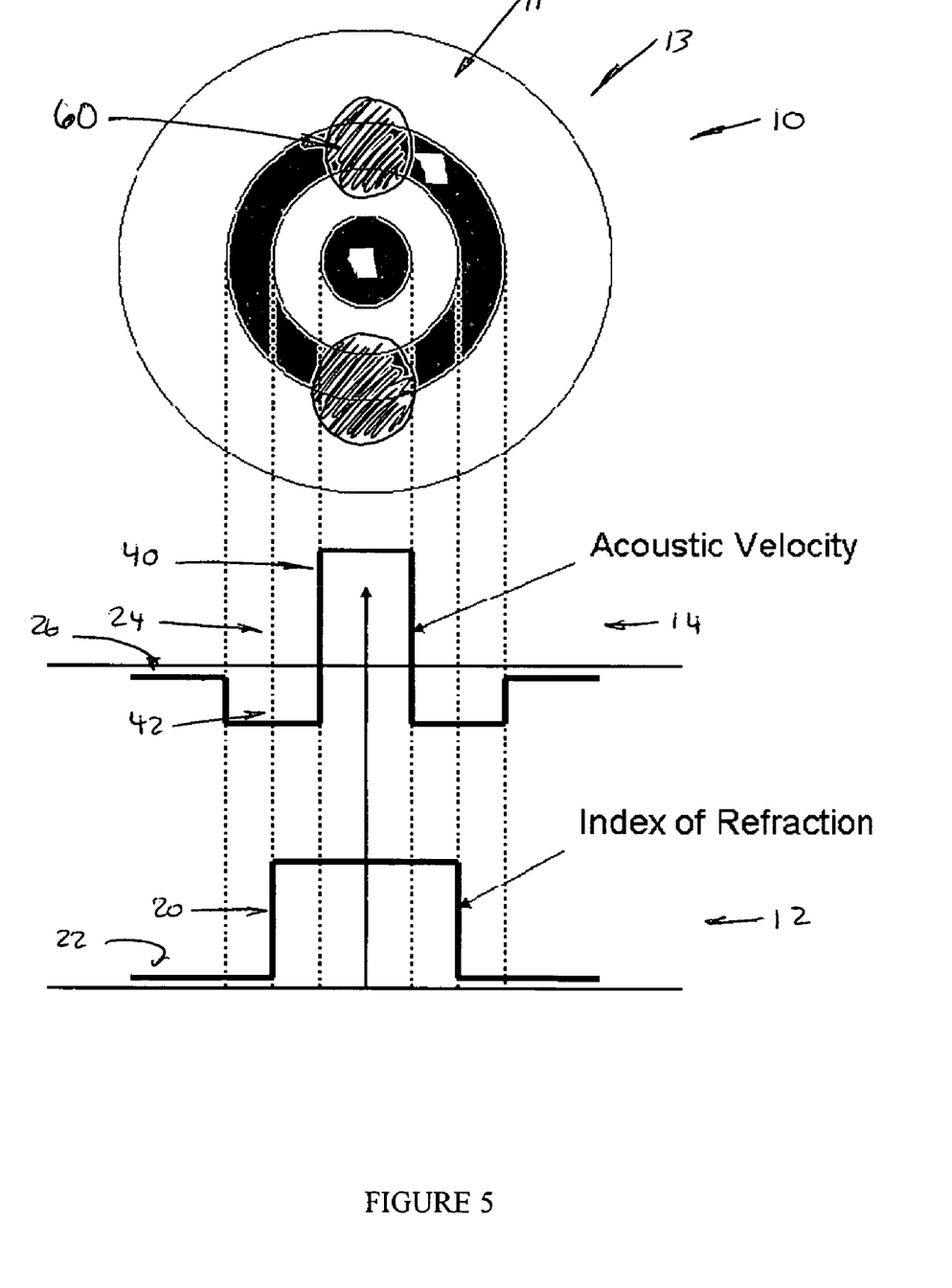
FIG. 5 of the drawings comprises a end view of a waveguide configuration, showing, in particular, one embodiment of a polarization maintaining means of the waveguide of the present disclosure.

Additionally, and as is shown in FIG. 5, the waveguide may further include means 60 for maintaining polarization of the optical mode within the fiber. In the embodiment shown, two rods are inserted in the perform at approximately 180° relative to each other within the optical cladding. In other embodiments, the polarization maintaining means may comprise the altering of the cross-sectional configuration of the fiber so as to maintain polarization. For example, polarization may be maintained by squeezing the waveguide into an elliptical cross-sectional configuration. Of course, to one of ordinary skill in the art, any number of other means utilized for maintaining polarization are likewise suitable for use in association with the present waveguide, such as the use of 'bowtie' or circular stress elements.

With respect to performance, waveguides made in accordance with the present disclosure have an appreciable improvement over the prior art SBS suppression waveguides. For example, and while not limited thereto, such fibers exhibit an SBS threshold which is at least eight times that of bulk pure silica to well in excess of twenty times that of bulk pure silica. Indeed, it is contemplated that the SBS threshold of such waveguides may approach 100 times that of bulk pure silica.

The waveguide disclosed herein may be manufactured in any number of different manufacturing processes. To achieve the necessary optical and acoustic properties, dopants may be introduced into the waveguide perform through any one of solution diffusing (or solution doping), MCVD, and direct nanoparticle deposition. As will be understood, as the dopants can be diffused into the perform with greater precision and accuracy, the greater the SBS threshold of the resulting waveguide.

The foregoing description is merely explanatory and illustrative and not deemed limiting except insofar as the appended claims are so limited, as those skilled in the art who have the disclosure before them will be able to make modifications without departing from the scope thereof. Among multiple variations that are contemplated by the present disclosure, it is possible to increase the number of both the optical and acoustic layers depending on the particular waveguide and intended use. For example, it is possible to design a similar structure for an SBS-suppressing higher-order-mode (HOM) fiber. In this structure, it would be likely that there would be additional structure, such as additional optical layers, in the fiber to predominantly guide a selected HOM in the fiber. Thus, the acoustic structure would therefore also likely be required to have additional layers. The foregoing is within the scope of the disclosure and further provides the degradation of spatial and spectral overlaps of a plurality of dominant acoustic mode profiles with the optical field. Of course, other variations within the scope of the disclosure are likewise contemplated.

What is claimed is:

1. A waveguide configuration comprising:
    a optical core having an optical core radial thickness and a core index of refraction, and, at least one optical cladding surrounding the core, the at least one optical cladding having a cladding index of refraction, cooperating to define an optical mode, wherein the effective index of refraction of the optical mode is greater than the cladding index of refraction;
    an acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
    wherein the first region radial thickness is smaller than the optical core radial thickness and the sum of the first region radial thickness and the second region radial thickness is greater than the optical core radial thickness; and
    the first region acoustic velocity is greater than the second region acoustic velocity and the acoustic cladding acoustic velocity is greater than the second region acoustic velocity.

2. The waveguide configuration of claim 1 wherein the first region radial thickness is less than approximately 66% that of the optical core radial thickness.

3. The waveguide configuration of claim 2 wherein the first region radial thickness is less than approximately 50% that of the optical core radial thickness.

4. The waveguide configuration of claim 1 wherein the total of the first region radial thickness and second region radial thickness is at least 33% greater than the optical core radial thickness.

5. The waveguide configuration of claim 1 further comprising a buffer surrounding an outermost cladding of the at least one cladding, the buffer having an index of refraction.

6. The waveguide configuration of claim 5 wherein the at least one optical cladding comprises a single cladding and the index of refraction of the buffer is greater than the index of refraction of the single cladding.

7. The waveguide configuration of claim 5 wherein the at least one optical cladding comprises a single cladding and the index of refraction of the buffer is less than the index of refraction of the single cladding.

8. The waveguide configuration of claim 5 wherein the at least one optical cladding comprises at least a first optical cladding and a second optical cladding surrounding the first optical cladding, the index of refraction of the buffer is less than the index of refraction of the second optical cladding.

9. The waveguide configuration of claim 1 wherein the acoustic velocity of the first region is one of greater than and equal to the acoustic velocity of the acoustic cladding.

10. The waveguide configuration of claim 1 wherein the optical core is doped with a rare earth element of the group consisting of: Einsteinium, Erbium, Neodymium, Praseodymium, Samarium, Thulium, Ytterbium, Dysprosium, Holmium and combinations of the foregoing.

11. The waveguide configuration of claim 1 further including polarization maintaining means.

12. The waveguide configuration of claim 1 wherein an outermost cladding of the at least one cladding has an outer boundary, the outer boundary of the outermost cladding of the at least one cladding being non-circular in cross-sectional configuration.

13. The waveguide configuration of claim 1 wherein at least a portion of the optical core is doped with $Al_2O_3$.

14. The waveguide configuration of claim 13 wherein at least a portion of the optical core that is doped with $Al_2O_3$ is doped with $Yb_2O_3$.

15. The waveguide configuration of claim 1 wherein an outermost optical cladding of the at least one optical cladding comprises $SiO_2$.

16. The waveguide configuration of claim 1 wherein the optical cladding is doped with at least one of the group consisting of B, F, Ge, P, Ti and combinations of the foregoing.

17. The waveguide configuration of claim 1 wherein the SBS threshold is at least eight times that of bulk pure silica.

18. The waveguide configuration of claim 1 wherein the SBS threshold is at least ten times that of bulk pure silica.

19. The waveguide configuration of claim 1 wherein the SBS threshold is at least twenty times that of bulk pure silica.

20. The waveguide configuration of claim 1 wherein the optical core has a radial thickness of at least 7.5 microns.

21. The waveguide configuration of claim 17 wherein the optical cladding has a diameter of approximately 400 microns.

22. A waveguide configuration comprising:
    a optical core having an optical core radial thickness and a core index of refraction, and, at least one optical cladding surrounding the core, the at least one optical cladding having a cladding index of refraction, cooperating to define an optical mode, wherein the effective index of refraction of the optical mode is greater than the cladding index of refraction;
    an acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
    wherein the first region radial thickness is smaller than the optical core radial thickness and the sum of the first region radial thickness and the second region radial thickness is greater than the optical core radial thickness; and
    the first region acoustic velocity is less than the second region acoustic velocity and the acoustic cladding acoustic velocity is less than the second region acoustic velocity.

23. The waveguide configuration of claim 22 wherein the first region radial thickness is less than approximately 66% that of the optical core radial thickness.

24. The waveguide configuration of claim 22 wherein the total of the first region radial thickness and second region radial thickness is at least 33% greater than the optical core radial thickness.

25. The waveguide configuration of claim 22 further comprising a buffer surrounding an outermost cladding of the at least one cladding, the buffer having an index of refraction.

26. The waveguide configuration of claim 22 wherein the acoustic velocity of the first region is one of greater than and equal to the acoustic velocity of the acoustic cladding.

27. The waveguide configuration of claim 22 wherein the optical core is doped with a rare earth element of the group consisting of: Einsteinium, Erbium, Neodymium, Praseodymium, Samarium, Thulium, Ytterbium, Dysprosium, Holmium and combinations of the foregoing.

28. The waveguide configuration of claim 22 further including polarization maintaining means.

29. The waveguide configuration of claim 22 wherein an outermost cladding of the at least one cladding has an outer boundary, the outer boundary of the outermost cladding of the at least one cladding being non-circular in cross-sectional configuration.

30. The waveguide configuration of claim 22 wherein the SBS threshold is at least ten times that of bulk pure silica.

31. A method of increasing an SBS threshold comprising the steps of:
   identifying a first dominant acoustic mode within a waveguide;
   identifying a second dominant acoustic mode within a waveguide;
   controllably guiding each of the first and second dominant acoustic modes in at least two regions of an acoustic core, the acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
   wherein the first region radial thickness is smaller than the optical core radial thickness and the sum of the first region radial thickness and the second region radial thickness is greater than the optical core radial thickness; and
   wherein the first region acoustic velocity is greater than the second region acoustic velocity and the acoustic cladding acoustic velocity is greater than the second region acoustic velocity.

32. The method of claim 31 wherein the second dominant acoustic mode comprises an acoustic mode where an acoustic velocity thereof is greater than the longitudinal acoustic velocity of either the acoustic core or the acoustic cladding.

33. A waveguide comprising:
   an optical core and an optical cladding;
   an acoustic core and an acoustic cladding;
   wherein an acoustic boundary resides within the optical core and an optical boundary resides within the acoustic core, the acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
   wherein the first region radial thickness is smaller than the optical radial thickness and the sum of the first region radial thickness and the second region radial thickness is greater than the optical core radial thickness; and
   wherein the first region acoustic velocity is greater than the second region acoustic velocity and the acoustic cladding acoustic velocity is greater than the second region acoustic velocity.

34. A waveguide comprising:
   an optical core and an optical cladding;
   an acoustic core and an acoustic cladding;
   means for controllably guiding a first dominant acoustic mode and a second dominant acoustic mode within the acoustic core toward degrading the spectral and spatial overlap between an optical wave and the first and second acoustic modes, the acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
   wherein the first region radial thickness is smaller than the optical radial thickness and the sum of the first region radial thickness and the second region radial thickness is greater than the optical core radial thickness; and
   wherein the first region acoustic velocity is greater than the second region acoustic velocity and the acoustic cladding acoustic velocity is greater than the second region acoustic velocity.

35. A method of increasing an SBS threshold comprising the steps of:
   identifying a first dominant acoustic mode within a waveguide;
   identifying a second dominant acoustic mode within a waveguide;
   controllably guiding each of the first and second dominant acoustic modes in at least two regions of an acoustic core, the acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
   wherein the first region radial thickness is smaller than the optical core radial thickness and the sum of the first region radial thickness and the second region radial thickness is greater than the optical core radial thickness; and
   wherein the first region acoustic velocity is less than the second region acoustic velocity and the acoustic cladding acoustic velocity is less than the second region acoustic velocity.

36. The method of claim 35 wherein the second dominant acoustic mode comprises an acoustic mode where an acoustic velocity thereof is greater than the longitudinal acoustic velocity of either the acoustic core or the acoustic cladding.

37. A waveguide comprising:
   an optical core and an optical cladding;
   an acoustic core and an acoustic cladding;
   wherein an acoustic boundary resides within the optical core and an optical boundary resides within the acoustic core, the acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;
   wherein the first region radial thickness is smaller than the optical core radial thickness and the sum of the first region radial thickness and the second region radial thickness is greater than the optical core radial thickness; and
   wherein the first region acoustic velocity is less than the second region acoustic velocity and the acoustic cladding acoustic velocity is less than the second region acoustic velocity.

38. A waveguide comprising:

an optical core and an optical cladding;

an acoustic core and an acoustic cladding;

means for controllably guiding a first dominant acoustic mode and a second dominant acoustic mode within the acoustic core toward degrading the spectral and spatial overlap between an optical wave and the first and second acoustic modes, the acoustic core having at least two regions, a first region having a first region radial thickness and a first region acoustic velocity, and, a second region surrounding the first region having a second region radial thickness and a second region acoustic velocity, and an acoustic cladding surrounding the acoustic core having an acoustic cladding acoustic velocity;

wherein the first region radial thickness is smaller than the optical core radial thickness and the sum of the first region radial thickness and the second region radial thickness is greater than the optical core radial thickness; and wherein the first region acoustic velocity is less than the second region acoustic velocity and the acoustic cladding acoustic velocity is less than the second region acoustic velocity.

* * * * *